(12) United States Patent
Wu

(10) Patent No.: US 9,941,685 B2
(45) Date of Patent: Apr. 10, 2018

(54) LEAKAGE PROTECTION METHOD AND DEVICE HAVING LIVE/NEUTRAL WIRE IDENTIFICATION FUNCTION

(71) Applicant: Wei Wu, Wenzhou (CN)

(72) Inventor: Wei Wu, Wenzhou (CN)

( * ) Notice: Subject to any disclaimer, the term of this patent is extended or adjusted under 35 U.S.C. 154(b) by 392 days.

(21) Appl. No.: 14/767,915

(22) PCT Filed: Feb. 20, 2014

(86) PCT No.: PCT/IB2014/000486
§ 371 (c)(1),
(2) Date: Aug. 14, 2015

(87) PCT Pub. No.: WO2014/128562
PCT Pub. Date: Aug. 28, 2014

(65) Prior Publication Data
US 2015/0372475 A1   Dec. 24, 2015

(30) Foreign Application Priority Data

Feb. 23, 2013   (CN) .......................... 2013 2 0083641
May 21, 2013   (CN) .......................... 2013 2 0286391
Jul. 14, 2013   (CN) .......................... 2013 1 0300405

(51) Int. Cl.
H02H 3/16   (2006.01)
H02H 11/00   (2006.01)
H02H 3/14   (2006.01)

(52) U.S. Cl.
CPC .............. *H02H 3/162* (2013.01); *H02H 3/14* (2013.01); *H02H 11/002* (2013.01)

(58) Field of Classification Search
CPC ......... H02H 3/14; H02H 3/162; H02H 11/002

USPC .......................................................... 361/42
See application file for complete search history.

(56) References Cited

U.S. PATENT DOCUMENTS

| 5,783,875 A * | 7/1998 | Jaros ..................... H03K 17/962 307/116 |
| 2005/0024798 A1 * | 2/2005 | Reynoso ................. H02H 3/08 361/42 |
| 2006/0017446 A1 * | 1/2006 | Howell ................ G01R 31/025 324/509 |

FOREIGN PATENT DOCUMENTS

| CN | 102856967 A | * | 1/2013 |
| CN | 202651751 U | * | 1/2013 |

OTHER PUBLICATIONS

Machine translation of Wu Chinese Patent Document CN 202651751 U Jan. 2013.*

(Continued)

*Primary Examiner* — Thienvu Tran
*Assistant Examiner* — Kevin J Comber

(57) ABSTRACT

A leakage protection method and device with live/neutral wire identification that identify live wire and neutral wire of a power supply by means of a live/neutral wire identification device, and correct live/neutral wire connections, so that a surface leakage signal pickup device is always connected to the neutral wire and to surface of the electric device, and electric potential of the surface is always monitored over the neutral wire. When the Surface leaks electricity, the leakage signal pickup device immediately drives an electromagnetic tripping device to break a main circuit switch, thereby breaking the connection between the electric device and the power source. The method and device work effectively even when the electric device is not grounded.

13 Claims, 6 Drawing Sheets

(56) References Cited

OTHER PUBLICATIONS

Machine translation of Guo Chinese Patent Document CN 102856967 A Jan. 2013.*

* cited by examiner 1 live/neutral wire identification device
2 surface leakage signal pickup device
3 electromagnetic tripping device
4 live/neutral wire conversion switch

LEAKAGE PROTECTION METHOD AND DEVICE HAVING LIVE/NEUTRAL WIRE IDENTIFICATION FUNCTION

CROSS-REFERENCE TO RELATED APPLICATION

The present application is a continuation of PCT/IB2014/000486, filed on 20 Feb. 2014, which claims priority to Chinese patent Application No. 201320083641.9, entitled "A power supply circuit live/neutral wire identification system," filed on 23 Feb. 2013, and Chinese patent Application No. 201320286391.9, entitled "An adaptive correction system for live/neutral wire of leakage protection device," filed on 21 May 2013, and Chinese patent Application No. 201310300405.2, entitled "New leakage protection method and device having a live/neutral wire identification function," filed on 14 Jul. 2013. The disclosures of the above applications are hereby incorporated by reference in their entirety.

FIELD OF THE INVENTION

The present invention relates to a method of electric leakage detection and prevention, more particularly, to a method of electric leakage detection and prevention having a live/neutral wire identification function and system thereof.

BACKGROUND OF THE INVENTION

"Surface Leakage Protection Device" (SLPD) which is based on electric leakage protection, compared with "Residual Current Device" (RCD) which is based on the residual current monitoring, can cut off the electrical connection between an electric device and the power source before a person touches the energized surface of the electric device due to electric leakage, turning passive "electric shock protection" into active "electric leakage prevention". Patent document 201120482689.8 "The surface leakage detection and prevention method and system" gives the solution of leakage detection of a specific "surface leakage protection device". A SLPD monitors the electric potential difference between the neutral wire of the power source and surface of the electric device, once the potential difference exceeds a preset threshold, drives follow-up circuit to break the main circuit switch, thereby breaking the connection between the electric device and the power source.

Technical Problem

But in the practice, the live/neutral wires of the power source may be swapped due to wiring errors; meanwhile the electric device keeps running, the SLP device is monitoring the potential difference between the surface of the electric device and the live wire of the power source instead of the potential difference between the surface of the electric device and the neutral wire of the power source; in case the electric leakage occurs, since there is no potential difference between the surface of the electric device and the live wire of the power source, the SLPD will not be tripped, thereby the surface leakage cannot be prevented.

Additionally, for some electric devices in which the neutral wires are connected to the electric device surfaces, swapping live wire and neutral wire will energize the electric device surface, resulting in an electric shock accident if a person touches the energized electric device surface. In these cases, the live/neutral wire identification is required to make sure that the live and neutral wires are wired correctly. The existing leakage prevention devices have no such a function to alert or correct the wiring errors of the live/neutral wires of the power source.

SUMMARY OF THE INVENTION

The present invention improves above-mentioned defects by providing an electric leakage protection method and device having a live/neutral wires identification function, which can adjust the connection between the electric device and the power source or adjust the connection of a "surface leakage protection" device according to live/neutral wire wiring condition, so that the "surface leakage protection" device can always monitor correctly the electric potential of the surface of the electric device over the neutral wire of the power source to realize predefined leakage protection function. Meanwhile, the wiring errors of live/neutral wires can be alerted.

The above-mentioned objective can be achieved by means of below technical solutions. Propose a method of "surface leakage protection" with live/neutral wire identification:

A method of electric leakage detection having a live/neutral wire identification function comprising:

1. Identify the live wire L or the neutral wire N of the power source;

2. If it is discovered that the live wire L is erroneously connected to the neutral wire N' of an electric device or the neutral wire N is erroneously connected to the live wire L' of an electric device due to the live/neutral wires are erroneously connected, then, change the connections of the "surface leakage detection device" from connecting between the surface wire F' and the neutral wire N' of the electric device into connecting between the surface wire F' and the live wire L' of the electric device; or, reconnect the live wire L' to the live wire L and the neutral wire N' to the neutral wire N; or, a main circuit switch K is made such that the main circuit switch cannot close the circuit or that the main circuit switch breaks the circuit immediately after closing the circuit;

3. The "surface leakage detection device" which is connected between the surface wire F' and the neutral wire, monitors the electric leakage of the electric device surface, once the leakage is found, immediately breaks the main circuit switch K which connects the power source and the electric device.

Propose a device of electric leakage protection having a live/neutral wire identification function to achieve the objective of the invention:

A device of electric leakage protection having a live/neutral wire identification function comprising: the live wire L' of the electric device which is connected to the live wire L of the power source by default, the neutral wire N' of the electric device which is connected to the neutral wire N of the power source by default, a wire F' which is connected to the electric device surface, the surface leakage signal pickup device 2, and the electromagnetic tripping device 3 which controls the main circuit switch K; wherein it also comprising the live/neutral wire identification device 1, the input of device 1 is connected to the live wire L' or the neutral wire N', the output is connected to the surface leakage signal pickup device 2 or the electromagnetic tripping device 3 or the live/neutral wire conversion switch 4; the device 2 has one terminal connected to the surface wire F', another terminal connected to the neutral wire N through N' or through L'.

The electric leakage protection device having a live/neutral wire identification function, wherein the live/neutral wire identification device 1, its input is connected to L' or N', its output is comprised of a group or multiple-group conversion switches or contacts; the surface leakage signal pickup device 2 has one terminal connected to F', one terminal connected to N via the conversion switch of the device 1 and N', in case of the live/neutral wires are swapped causing the live wire L' connecting to the neutral wire N or the neutral wire N' connecting to the live wire L, the device 1 is activated, its conversion switches or contacts reconnect the surface leakage signal pickup device 2 which is previously connected to the neutral wire N through the neutral wire N', to the neutral wire N through the live wire L'.

The electric leakage protection device having a live/neutral wire identification function, wherein the live/neutral wire identification device 1, its input is connected to the live wire L' or the neutral wire N', its output is comprised of a group or multiple-group conversion switches or contacts that consist the live/neutral wire conversion switch 4; the surface leakage signal pickup device 2 has one terminal connected to the surface wire F', one terminal connected to the neutral wire N via the neutral wire N', in case of the live/neutral wires are swapped causing the live wire L' connecting to the neutral wire N or the neutral wire N' connecting to the live wire L, the device 1 is activated, the switch 4 reconnects the live wire L' to the live wire L and the neutral wire N' to the neutral wire N.

The electric leakage protection device having a live/neutral wire identification function, wherein the live/neutral wire identification device 1, its input is connected to the live wire L' or the neutral wire N', its output is comprised of a group or multiple-group conversion switches or contacts; the surface leakage signal pickup device 2 has one terminal connected to the surface wire F', one terminal connected to the neutral wire N of the power source through N'; in case of the live/neutral wires are swapped causing the live wire L' being connected to the neutral wire N or the neutral wire N' being connected to live wire L, the device 1 works or not works, the main circuit switch K which is controlled by output switches or contacts of device 1, is made such that it could not close the circuit or that it breaks the circuit immediately after closing the circuit. A user can only switch on the leakage protection device after reconnect the live wire L' to the live wire L, and the neutral wire N' to the neutral wire N, so that the leakage signal pickup device 2 is always connected to the neutral wire N, thereby eliminating potential accidents may be caused by the live/neutral wires wiring errors.

the live/neutral wire identification device 1 can also control light or audio alarms according to the live/neutral wire identification results, to prompt the wiring errors.

the above-mentioned live/neutral wire identification device 1 can be any circuit or device which may identify the live or neutral wire and may output control signals, and is not limited to be only the live/neutral wire identification devices described below.

The electric leakage protection device having a live/neutral wire identification function, wherein the live/neutral wire identification device 1, comprising the current limiting component Z, the luminous component B1 and the touch electrode A; B1 in series with Z, one end is connected to A, and another end is connected to the live wire L or the neutral wire N directly or through the live wire L' or the neutral wire N'; the touch electrode A may contain the conductors that a person will touch during operating the electric leakage protection device.

The electric leakage protection device having a live/neutral wire identification function, wherein the live/neutral wire identification device 1, comprising the current limiting component Z, the luminous component B1 and the touch electrode A; B1 in series with Z, one end is connected to A, and another end is connected to the live wire L or the neutral wire N directly or through the live wire L' or the neutral wire N'; the touch electrode A may contain the surface F of the electric device which is connected to the surface wire F'.

Generally speaking, unexpected power failure can cause the live/neutral wire identification circuit of an electric leakage protection device being reset, and therefore a re-identification of the live/neutral wire is required when the power source is restored. For the applications in which the main circuit switch of an leakage protection device is required to remain closing when an unexpected power source failure occurs, because the main circuit switch is still on, no manual operation is required when the power source is restored, that makes it impossible to trip the live/neutral wire identification device once again by means of contacting the touch electrode during the manual operation to complete a new live/neutral wire identification. For those applications, the above mentioned leakage protection device having the touch electrode A being connected to the electric device surface which is connected to the surface wire F' to create a path for leakage flowing from the electric device surface to ground, can get equal effect of a person contacts the touch electrode; or, by means of a person touching the electric device surface during the usage of the device, complete the live/neutral wire identification process.

The electric leakage protection device having a live/neutral wire identification function, wherein the live/neutral wire identification device 1, comprising the current limiting component Z, the luminous component B1 and the touch electrode A; B1 in series with Z, one end is connected to A, and another end is connected to the live wire L or the neutral wire N directly or through the live wire L' or the neutral wire N'; the touch electrode A may connect to the power ground directly or through the electric device surface wire F'.

The benefits of connecting the touch electrode A to the ground of the power source directly or through the surface wire F' is that, in case of the ground is well grounded, the live/neutral wire identification can be completed without a person contacting the touch electrode.

The electricity leakage protection device having a live/neutral wire identification function, wherein the live/neutral wire identification device 1, comprising the current limiting components Z1, Z2 and the induction electrode S; Z1 in series with Z2 is connected to the live wire L or the neutral wire N by one end, and is connected to the induction electrode S by another end; the two leads of Z2 are taken to the input of IC signal amplifier circuit.

The electricity leakage protection device having a live/neutral wire identification function, wherein the live/neutral wire identification device 1, comprising the high input impedance transistor or the field effect transistor and the induction electrode S, and a DC power source which is isolated from the power source under identification; the base electrode of the transistor or the gate of field effect transistor is connected to the induction electrode S, and the output of the transistor or the field effect transistor is connected with the IC signal amplifier circuit.

The electricity leakage protection device having a live/neutral wire identification function, wherein the surface leakage signal pickup device 2 may contain electromagnetic relay or solid relay, the output contacts of the relay are connected to the coil of the electromagnetic tripping device 3 directly or through a driving circuit, the coil of the electromagnetic relay is connected between the surface wire F' and the neutral wire N of the power source directly, or the coil of the electromagnetic relay in series with the impedance Z is connected between F' and N; the impedance Z can be either a variety of current limiting components, or rectifying components, or thyristor switch.

The electricity leakage protection device having a live/neutral wire identification function, wherein the surface leakage signal pickup device 2, may contain a current sensor T in which the live wire L and neutral wire N of the power source go through, and one or multiple current path I connecting the surface of the electric device and the neutral wire N of the power source; the current path I consists components which allow current to flow, and one end of current path I is connected to the surface F of the electric device through the surface wire F' of the electric device, another end is connected to the neutral wire N of the power source in a node located before or after the current sensor T.

The electricity leakage protection device having a live/neutral wire identification function, wherein the surface leakage signal pickup device 2, may contain the voltage sensor unit or the current sensor unit; the output of the voltage sensor unit or the current sensor unit, going through the intermediate circuit where it is shaped or amplified, trips the electromagnetic tripping device; or trips electromagnetic tripping device directly without going through the intermediate circuit.

Advantageous Effects

Compared with the prior art, the above method and apparatus of the present invention have below beneficial effects:

1. It is able to indicate or to correct the live/neutral wires of the power source wiring errors, eliminate potential accidents;
2. It is able to adjust wiring of the leakage protection device according to the live/neutral wires wiring errors, to ensure the leakage protection device work normally.
3. The innovative surface leakage protection circuit simplifies the structure of existing surface leakage protection device, improves the anti-interference ability and reliability of the device; by making the switch button surface and the electric device surface as a touch electrode, the device can complete the live/neutral wire identification and adjustments in a way user unaware;
4. The electric device surface leakage can be effectively prevented even when the electric device is not connected to ground.

BRIEF DESCRIPTION OF THE DRAWING

FIG. 5 and FIG. 6 (b) are structure diagrams of the embodiment 4 of present invention;
FIG. 5 and FIG. 6 (c) are structure diagrams of the embodiment 5 of present invention;
FIG. 7 and FIG. 2 are structure diagrams of the embodiment 6 of present invention;
FIG. 8 and FIG. 3 are structure diagrams of the embodiment 7 of present invention;
FIG. 9 and FIG. 4 are structure diagrams of the embodiment 8 of present invention;
FIG. 12(a) and FIG. 2 are structure diagrams of the embodiment 11 of present invention;
FIG. 12(b) and FIG. 2 are structure diagrams of the embodiment 12 of present invention;
FIG. 12(c) and FIG. 2 are structure diagrams of the embodiment 13 of present invention;

Inside the figures, there are: the live/neutral wire identification device 1, the surface leakage signal pickup device 2, the electromagnetic tripping device 3, the live/neutral wire conversion switch 4, the live wire L of the power source, the neutral wire N of the power source, the live wire L' of the electric device, the neutral wire N' of the electric device, the surface wire F' of the electric device, the main circuit switch K, the load RL, the electric device surface F, the touch electrode A, the induction electrode S, the luminous component B1, the photosensitive components B2, the current limiting component Z, the current path I, the relay J, the tripping coil or the relay coil C.

Figure 1:
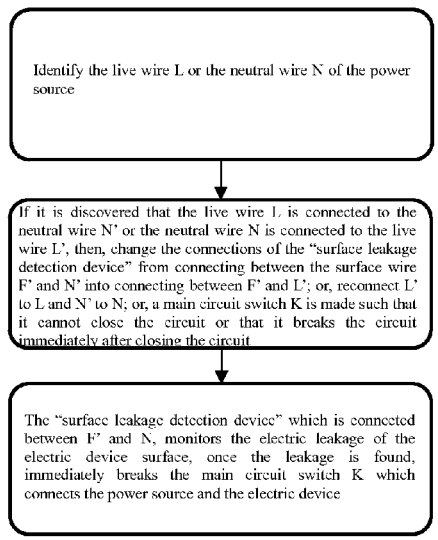
FIG. 1 is a flow chart of the method of the present invention.

BEST MODE EMBODIMENTS OF PRESENT INVENTION combing drawings and embodiments, we give further detailed explanations below:

FIG. 1 is the flow chart of the present invention, the electric leakage protection method having a live/neutral wire identification function. An electric leakage protection method having alive/neutral wire identification function, wherein its implementations comprising:

1. The identification of the live/neutral wires of the power source;
2. In case that the live/neutral wires are discovered to be erroneously connected resulting at the live wire L of the power source is connected to the neutral wire N' of the electric device or the neutral wire N of the power source is connected to the live wire L' of the electric device, then, adjust the connections of the leakage signal pickup device from being connected between the surface wire F' and the neutral wire N', into being connected between F' and L'; or, reconnects L' with L and N' with N; or, the main circuit switch K is configured such that the switch K cannot close the circuit or that the switch K breaks the circuit immediately after closing the circuit;
3. The leakage signal pickup device which is connected between the surface wire F' and the neutral wire N, monitors the surface leakage of the electric device, once the leakage is detected, immediately breaks the main circuit switch K which connects the power source and the electric device.

Figure 2:
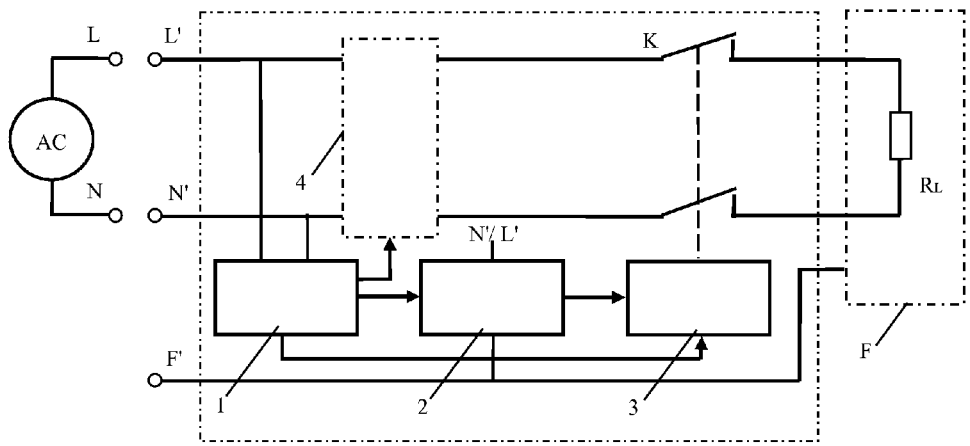
FIG. 2 is a schematic diagram of the device of the present invention.

FIG. 2 is a schematic diagram of the device of the present invention. In FIG. 2, the present invention device contains the live wire L' of the electric device, the neutral wire N' of the electric device, the surface wire F' of the electric device, the live/neutral wire identification device 1, the surface leakage signal pickup device 2 and the electromagnetic tripping device 3. L' and N' one ends are connected to L and N respectively; another ends are connected to the load RL through the main circuit switch K. F' may be connected to the surface F of the electric device directly, or through the switch K. The surface wire F' doesn't need to be connected with ground (the ground is not marked in FIG. 2). The surface wire F' grounding is not essential for realizing the functions of present invention method and device that is important for electricity safety of the families without grounding or with poor grounding. The input of the live/neutral wire identification device 1 is connected to L and/or N through L' and/or N'. Due to the logical relationship between the live wire and neutral wire, if one is the live wire, another one must be the neutral wire, so that in practice, the live/neutral wire identification device needs only to identify one of them to complete the live/neutral wire identification. According to the identification results, the live/neutral wire identification device may adjust the wiring of the surface leakage signal pickup device 2; or change the connections between the live/neutral wires of the power source and the live/neutral wires of the electric device; or, switch off the main circuit switch K through the main circuit switch control circuit, and make it cannot close the circuit or that it breaks the circuit immediately after closing the circuit, to force the user to correct the connections between the live/neutral wires of the power source and the live/neutral wires of the electric device; as results, the surface leakage signal pickup device 2 is arranged such that said device is always connected between the neutral wire N and the surface F, so that the present invention device can always monitor correctly the surface electric leakage, meanwhile may indicate the swap of the live/neutral wires by means of light or audio alarming (acousto-optic alarm device is not marked in the diagram). Once the electric device surface leaks electricity, the signal pickup device 2 immediately detects the potential difference between F' and N and drives the electromagnetic tripping device 3 to break the main circuit switch K, thereby breaking the connection between the electric device load RL and the power source, or prompt the audio or light alarm.

DETAILED DESCRIPTION OF BEST MODE EMBODIMENTS

Figure 3:
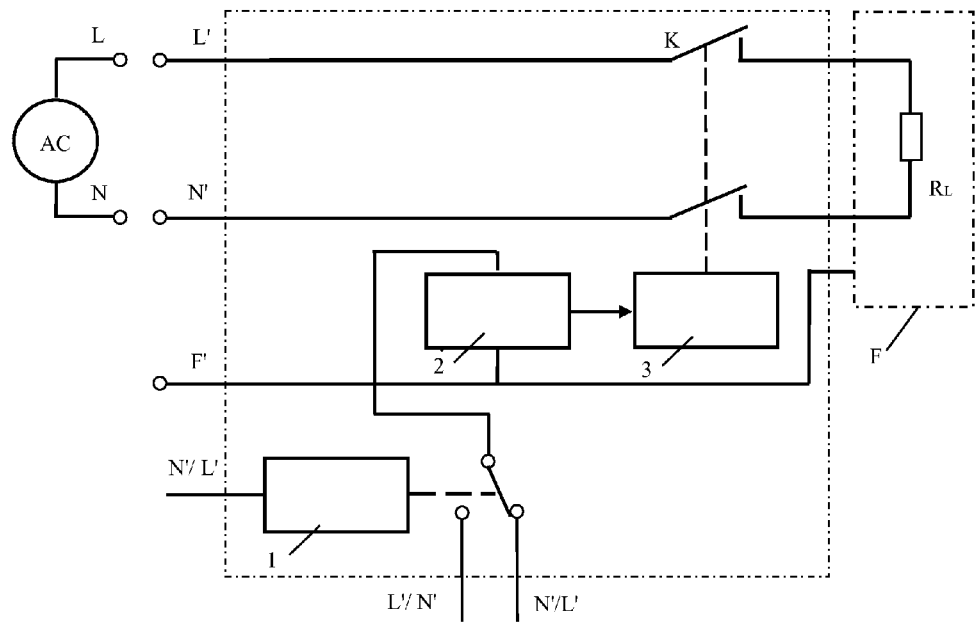
FIG. 3 is a structure diagram of the embodiment 1 of present invention.
Figure 4:
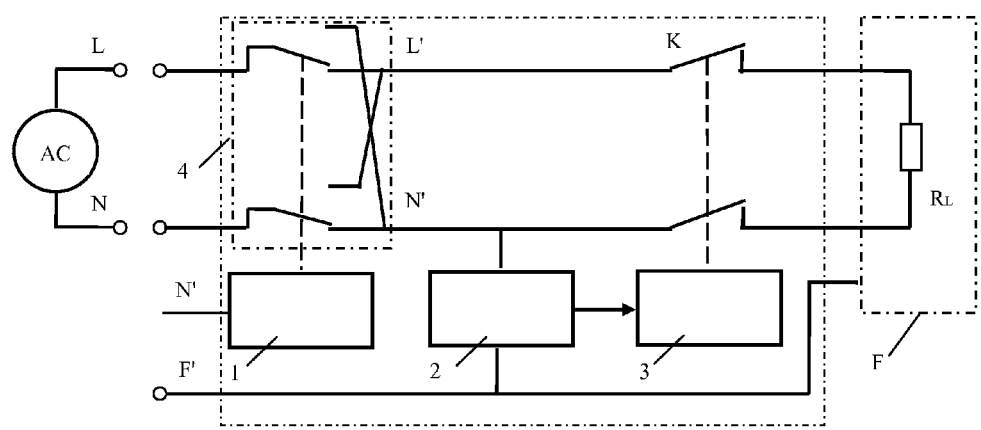
FIG. 4 is a structure diagram of the embodiment 2 of present invention.

The following description of the embodiments depicted by FIG. 3 and FIG. 4 further illustrates the working principle of the present invention.

Embodiment 1

FIG. 3 is the embodiment 1 of the present invention. FIG. 3 is similar to FIG. 2 and its function and effect are the same as depicted in FIG. 2. The difference is that in the FIG. 3, the output of the live/neutral wire identification device 1 comprises a single-pole double-throw switch or contacts, the single-pole is connected to the surface leakage signal pickup device 2, the double-throw is connected to the live wire L' and the neutral wire N' of the electric device. In case of the input of the live/neutral wire identification device is connected to the N' and, due to the swap of the live/neutral wires of the power source, the L' is connected with the N or, the N' is connected with the L, the live/neutral wire identification device 1 acts, the normally open contact of the single-pole double-throw switch or contacts closes, connecting the surface leakage signal pickup device 2 with the live wire L'. In case of the input of the live/neutral wire identification device is connected to the live wire L' and when the live wire L' is connected with the neutral wire N, or, the neutral wire N' is connected with the live wire L, because the input of the live/neutral wire identification device 1 is in fact connected to the neutral wire N due to the swap of the live/neutral wires of the power source, the live/neutral wire identification device 1 will not act, the normally closed contact of the single-pole double-throw switch or contacts remains closing, connecting the surface leakage signal pickup device 2 with the live wire L'. In short, when the neutral wire N is erroneously connected to the live wire L', the live/neutral wire identification device 1 will act or not according to predefinition, that ensures the leakage signal pickup device 2 always is connected to the neutral wire N of the power source.

Embodiment 2

FIG. 4 is the structure diagram of the embodiment 2 of present invention. FIG. 4 is similar to FIG. 2 and its function and effect are the same as depicted in FIG. 2. The difference is that in the FIG. 4, the input of the live/neutral wire identification device 1 is connected to the neutral wire N', and the output of the device 1 comprises the live/neutral wire conversion switch 4 made by a double-point double-throw switch or contacts in the main circuit. When the live/neutral wires of the power source are swapped causing that the live wire L' is connected with the neutral wire N or the neutral wire N' is connected with the live wire L, the live/neutral wire identification device 1 acts, the live/neutral wire conversion switch 4 switches to reconnect L' with L and N' with N. In this way, regardless how the live wire and neutral wire of the power source are wired, by means of the live/neutral wire identification device 1, the leakage signal pickup device 2 is always connected to the neutral wire N of the power source.

Embodiment

Some preferred embodiments of the present invention adopting several different live/neutral wire identification devices will now be described with reference to FIG. 5-9.

Embodiment 3

Figure 5:
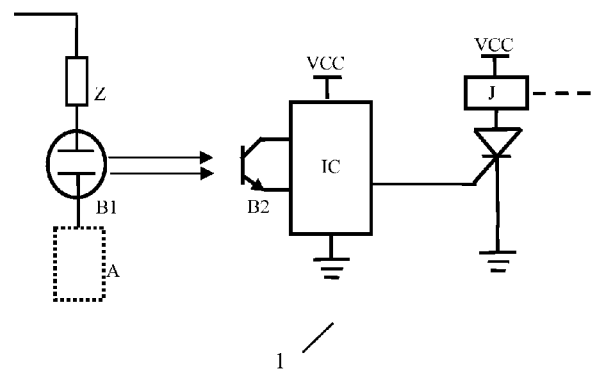
FIG. 5 and FIG. 6 (a) are structure diagrams of the embodiment 3 of present invention.
Figure 6:
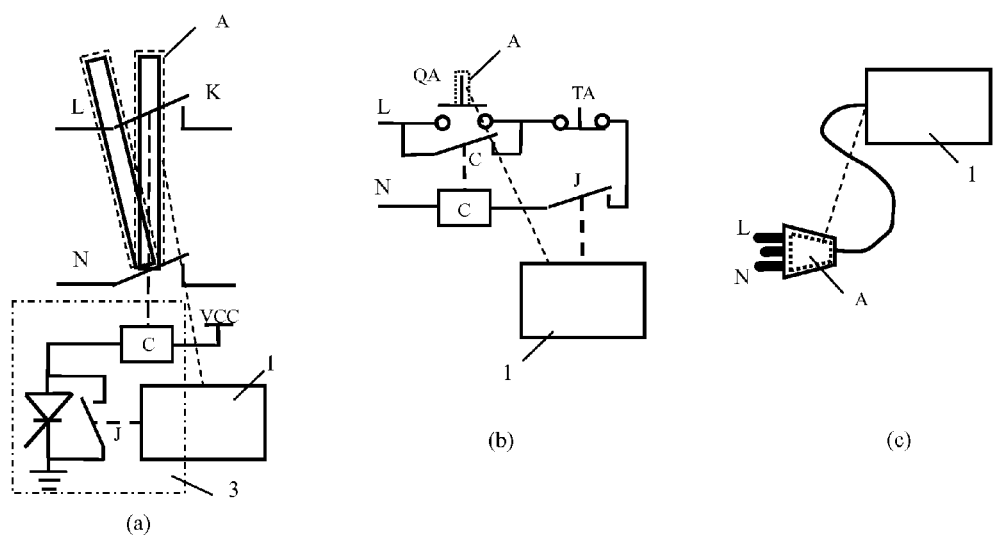
Figure 7:
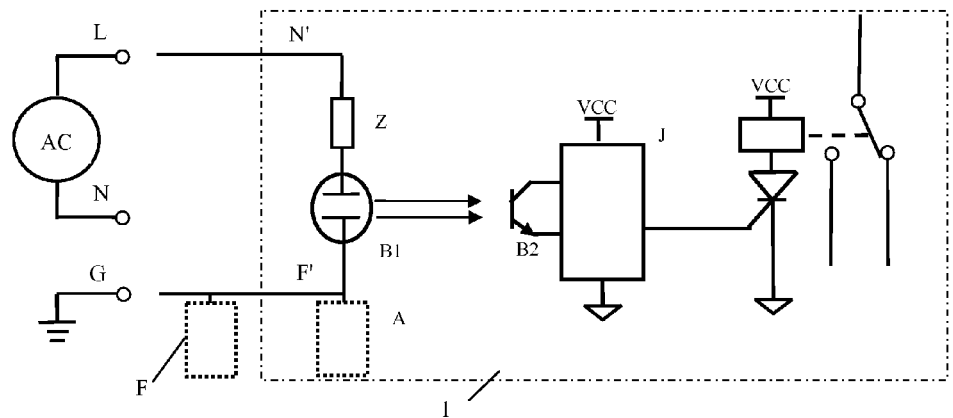

FIG. 2 along with the FIG. 5 and FIG. 6 (a) constitutes the embodiment 3 of present invention. FIG. 2 shows the present invention of the leakage protective device with live/neutral wire identification, in which the structure of the live/neutral wire identification device 1, as is described in more detail with reference to FIG. 5, is arranged such that the current limiting component Z in series with the luminous component B1 (neon) is connected between the live line L' (or the neutral wire N') and the touch electrode A. Further reference to FIG. 6(a), the touch electrode A is the conductor embedded in the surface of the handle of the toggle switch, or is a waterproof coat of conductive rubber on the button of the reset button switch K; to use the leakage protection device a user has to toggle or press the reset switch K to get through with the power source, that will contact the touch electrode A and trip the live/neutral wire identification device 1 to complete the live/neutral wire identification procedure. Referring again to FIG. 5, for this embodiment, the input of the live/neutral wire identification device 1 is connected with the live wire L', the normally closed contacts of the relay J are connected in parallel with SCR of the electromagnetic tripping device 3 illustrated in FIG. 6(a). When the power source are wired correctly, the live wire L' will be connected with the live wire L, toggling or pressing the reset switch K will make the user's body touch the touch electrode A, a current flowing through the live wire L, the current limiting impedance Z, the luminous component B1, the human body and the ground will make the luminous component B1 light, the photosensitive element B2 receives the light signal and turns on, which drives the IC to further trip and turn-on the SCR, the relay acts, opens the normally closed switch J that allows the reset switch to be able switched on. In case of the live wire L' is erroneously connected to the neutral line N, even if the human body contacts the touch electrode A, the luminous component B1 will not light, the relay J will not act and the normally closed switch J remains closed, then toggling or pressing the reset switch K will be unable to close the switch K, because in this moment the tripping coil C is energized, which releases the switch K, the objective of locking circuit is thus achieved.

Similarly, referring to FIG. 5, if the input of the live/neutral wire identification device 1 has been changed to be connected with the neutral wire N', and the normally closed switch J in FIG. 6(a) is changed to be the normally open switch, then, when the live/neutral wires of the power source were erroneously wired and the neutral wire N' is erroneously connected to the live wire L, the relay J acts, the normally open switch J closes, that makes the tripping coil C of the electromagnetic tripping device 3 energized, releasing the reset switch K, the objective of locking circuit is also achieved.

Embodiment 4

FIG. 2 along with the FIG. 5 and FIG. 6 (b) constitutes the embodiment 4 of the present invention. Compared with the embodiment 3, the embodiment 4 is different in below points: 1. Referring to FIG. 2, the main circuit switch K of the leakage protection device is controlled by a relay C (referring to FIG. 6(b)), energizing the relay C may close the main circuit switch K. With reference to FIG. 6(b), the relay C is connected to the power source through the normally open switch J of the live/neutral wire identification device 1, the stop button TA and the start button QA. 2. The touch electrode A is made by metal plating of the surface of the start button QA. By pressing the start button QA, the human body contacts the touch electrode A. If the live/neutral wires were wired correctly, that means referring to FIG. 5, the input of the live/neutral wire identification device 1 is connected with the live wire L, the luminous component B1 lights, the light signal is received by B2 and enlarged by IC and drives the relay J to act, the normally open switch J closes, the relay C (referring to FIG. 6(b)) is energized to switch on the main circuit switch K (illustrated in FIG. 2), meanwhile, the auxiliary contacts which are connected in parallel with the start button QA will close, to ensure that the relay C remains energized even after the start button QA is released, so that the main circuit switch K illustrated in FIG. 2 remains closed. If the live/neutral wires were wired erroneously, that means referring to FIG. 5, the input of the live/neutral wire identification device 1 is connected with the neutral wire N, the luminous component B1 will not light, the relay J does not act, the normally open switch J remains open, that makes the relay C referring to FIG. 6(b) cannot be energized to switch on the main circuit switch K (illustrated in FIG. 2), the objective of locking the circuit is achieved. In this case, only after wiring of the live/neutral wires of the power source is corrected, pressing the start button may close the main circuit switch K.

Above mentioned embodiment 3 and 4, its fundamental is to pre-lock the circuit first (making the circuit cannot be closed or breaks the circuit immediately after closing the circuit), then, during the operation of closing the main circuit switch K, unlock the circuit by correcting the wiring of the live/neutral wires and finally close the main circuit switch K. It can be also not pre-locking the circuit, instead, during the operation of closing the main circuit switch K, if the live/neutral wires were discovered erroneously wired, immediately lock the circuit (making the circuit cannot be closed or breaks the circuit immediately after closing the circuit). Both the methods force the user to correct the wiring errors, thus are indirect live/neutral wires correction solution.

Embodiment 5

FIG. 2 along with the FIG. 5 and FIG. 6 (c) constitutes the embodiment 5 of the present invention. Compared with the embodiment 3 and embodiment 4, the embodiment 5 is different in below points: 1. The touch electrode A in the live/neutral wire identification device 1 is a metal conductor embedded in the surface of the power plug of the leakage protection device, as shown in FIG. 6(c). Before users can use the leakage protection device, who must insert the power plug of the device into the power socket, so that touch the touch electrode A, that will trip the live/neutral wire identification device to fulfil the live/neutral wire identification. After the power plug is inserted into the socket and the live/neutral wire identification is completed, the live/neutral wires of the power source connected to the electric device will no longer change, until the power plug was removed. Then, reinsert the power plug into the socket will trip a new round of the live/neutral wire identification.

Embodiment 6

In most cases, the solution constituting the touch electrode by means of the surface conductor of the leakage protection device which the user must touch during the operation of the leakage protection device, for example, the surface conduct of a power plug or the surface conduct of a switch button may satisfy the live/neutral wire identification requirement. But for the leakage protection devices which require the main circuit switch remain closed after the power failure, when the power source is restored, due to the live/neutral wire circuit has been reinitiated in case of power failure, a new turn of live/neutral wire identification is required; but due to the main circuit is still closed, no further closing main circuit operation is required thus there is no chance for a user to touch the touch electrode to fulfil a new turn of live/neutral wire identification. The solution that uses the surface of the electric device as the touch electrode, or connecting the touch electrode with the ground may resolve above-mentioned problems, and its embodiment is given with reference to FIG. 2 and FIG. 7. Compared with the embodiment described with reference to FIG. 5, the embodiment 6 has below different points: referring to FIG. 7, the surface F of the electric device which is connected to with the surface wire F', is set as the touch electrode and is connected with power ground G. when the power source is restored after the power supply failure, or, when the leakage protection device is initially connected to the power source, in case of the power ground G is well grounded, the touch electrode provides good current flowing path forwarding ground, the live/neutral wire identification can be completed without a person touching the touch electrode A or the surface F of the electric device; in case of the power ground G is not well grounded or did not grounded, contacting the touch electrode A may fulfil the live/neutral wire identification; if the user has no chance to contact the touch electrode A, then, there is always the possibility that the user contacts the surface F during the use of the electric device, or the electric device installation has already made the surface F having a path allowing the current flowing to ground, thus is still able to complete the live/neutral wire identification without a person contacting the touch electrode. The working principle of the live/neutral wire identification and the leakage protection is the same as the embodiment illustrated in FIG. 5.

Embodiment 7

Figure 8:
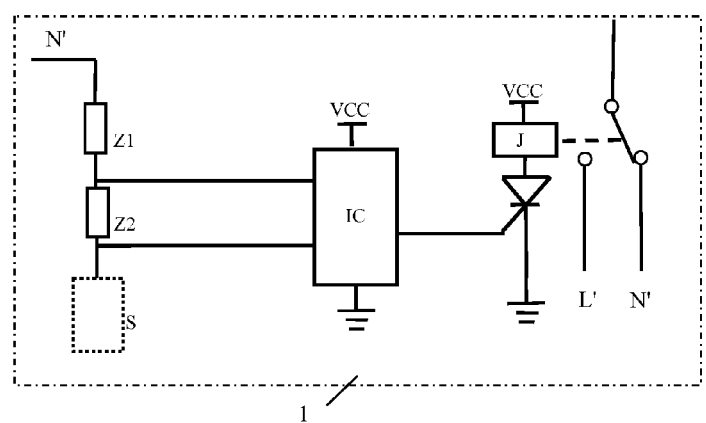

FIGS. 3 and 8 constituted the embodiment 7 of the present invention. FIG. 3 shows a leakage protection device with the live/neutral wire identification function in which the live/neutral wire identification device 1 is described in more detail with reference to FIG. 8, comprising the current limiting components Z1 and Z2, and the inductive electrode S; the Z1 in series with Z2 is connected between the live wire L (or the neutral wire N) and the induction electrode S; two leads of the Z2 are connected to the input of IC signal amplifier circuit directly or through photoelectric coupling, the contacts of the relay J is a single-pole double-throw switch. In this embodiment, the Z1 and Z2 are built by resistance components; the single-pole double-throw switch is wired in a way such that the single pole is connected with the leakage signal pickup device 2, one of the double-throw is connected with L' and another is connected with N', and the input of the live/neutral wire identification device 1 is connected to N'. In case the live/neutral wires are swapped resulting at the input of the live/neutral wire identification device being connected to live wire L, the Z1, Z2, the induct electrode S and the distribution capacitance of the S form a power path and generate voltage drop at both ends of Z2. The voltage drop on the Z2 is amplified by IC and trips SCR to switch on, the coil of the relay J is thus energized, the single pole double-throw switch acts, its normally open contacts closed to connect the leakage signal pickup device 2 with L'. Because in this moment the L' is connected with N, the leakage signal pickup device 2 is still connected with N through L'.

Embodiment 8

Figure 9:
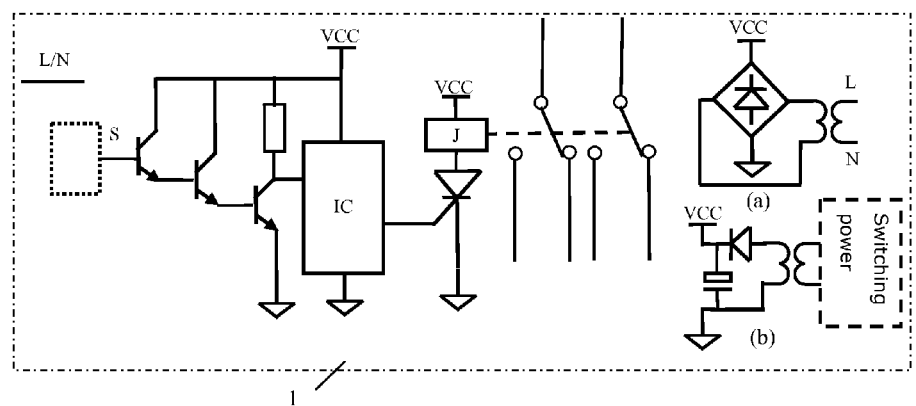

FIGS. 4 and 9 constituted the embodiment 8 of the present invention. FIG. 4 shows a leakage protection device with the live/neutral wire identification function in which the device 1 is further described in more detail with reference to FIG. 9, comprising the High Input Impedance Transistor (HIIT) or the Field Effect Transistor (FET) and the inductive electrode S; the base of HIIT or the gate of FET is connected with the inductive electrode S, the output of the HIIT or FET is connected with IC signal amplifier circuit. The output of the relay J is a double pole double-throw switch which is wired into the main circuit as illustrated in FIG. 4. In case of the inductive electrode S is preset closed to the N', if the N' is erroneously connected with L, the inductive electrode S will sense AC signal, the HIIT or EFT will turn on, the "turn on" signal is further amplified by IC and trips SCR to turn on, the relay J is energized, the double pole double-throw switch act, reconnecting L' with L and N' with N.

In practice, even the power source is wired correctly and the N' is connected with N, the inductive electrode S may still sense some AC power signal that makes above mentioned live/neutral wire identification solution hard to realize. It is because the DC working power of the live/neutral wire identification device 1 comes from the same AC power source which is under identification, so that some AC power signals are coupled in through the DC power and are picked up by the inductive electrode S. Therefore, we use the isolated transformer in the DC power VCC converter circuit, to break the couple path between the AC power source and the device 1, so that if the live/neutral wire are wired correctly, the inducted AC signal in the inductive electrode S will be very weak so that the live/neutral wire can be identified for certain. There are variety power conversion solutions with the transformer isolation; this embodiment gives two commonly used solutions. One uses direct transformer buck rectifier to get DC power as illustrated in FIG. 9(a), another uses a switching power supplier in which the high frequency AC signal is coupled through a transformer and rectified into the DC power source.

Some preferred embodiments of the present invention adopting several different surface leakage signal pickup devices will now be described with reference to FIGS. 10-12.

Embodiment 9

Figure 10:
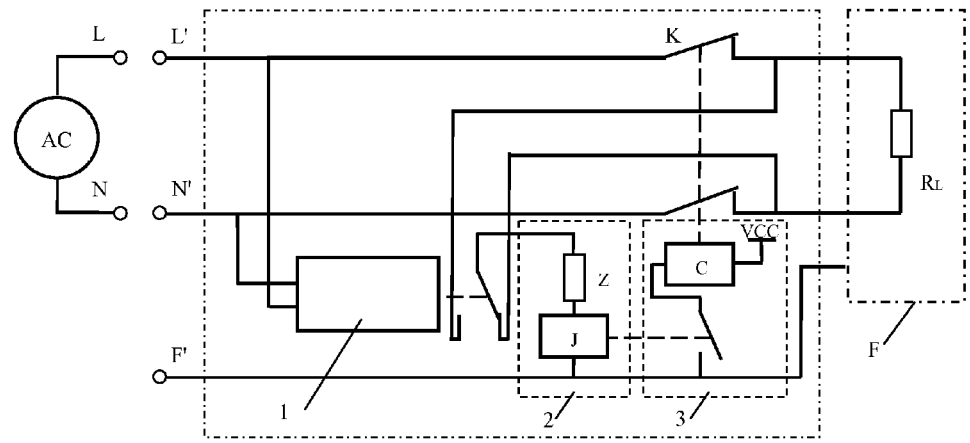
FIG. 10 is a structure diagram of the embodiment 9 of present invention.

FIG. 10 shows the embodiment 9 of the present invention. Referring to FIG. 10, the leakage signal pickup device 2 comprises the electromagnetic or solid state relay J, the output contacts or switch of the relay J is connected with the coil driver circuit of the tripping device 3 or, is directly connected to the tripping coil C of the tripping device 3. The coil of the relay J is connected directly between F' and N, or the coil in series with the impedance Z is connected between F' and N; the impedance Z can be a variety of current limiting components providing AC power supply to AC relay; or can be rectifier components providing DC power supply to DC relay; or can be unidirectional thyristor or bidirectional thyristor switch, and the cathode and anode of the unidirectional thyristor or the first anode and the second anode of the bidirectional thyristor are connected in series with the coil of the relay, the control pole is connected to F' or N through a current limiting component, so that when the electric leakage of the surface reaches a certain threshold, the SCR is triggered, the relay J is switched on. In this embodiment, the relay J is a DC electromagnetic relay, a resistor in series with a rectifier diode forms the impedance Z to provide DC power to the coil of the relay J. The rated working voltage of the relay J is properly low so that the relay J will pull-in when the electric leakage occurs and the potential difference between the surface of the electric device and N reaches a preset threshold, the contacts of the relay J closes to energize the tripping coil C of the tripping device 3, to turn off the main circuit switch K. In this embodiment, the leakage signal pickup device 2 is connected to the N' or L' in a node after the main circuit switch K, so that when the relay J acts and breaks the main circuit switch K, the relay J will lose the working power immediately, even the leakage voltage that drops at the both leads of the coil of the relay J may be higher than rated operational voltage of the relay, due to it is only an instantaneous high voltage, will not harm the relay J.

Embodiment 10

Figure 11:
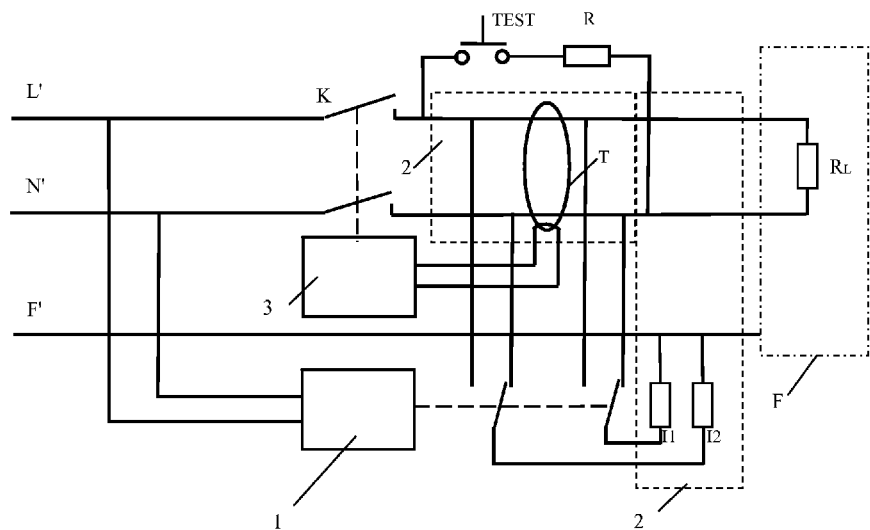
FIG. 11 is a structure diagram of the embodiment 10 of present invention.

FIG. 11 constitutes the embodiment 10 of the present invention. In FIG. 11, the leakage signal pickup device 2 contains a current sensor T in which the live wire L and the neutral wire N go through, and the current path I1 and I2 which connect F' and N. in this embodiment, the current I1 and I2 are built by resistors, the path I1 has one end connected to the F through F', another end connected with N in a node after the current sensor T; the current path I2 has one end connected with F through F', another end connected with N in a node before the current sensor T. Under normal circumstances, the currents flow through the wire L' and N' then converge to the current sensor T are equal and opposite, that will not produce voltage in the secondary of the current sensor T. In case of a person touches the live wire of the load, a small portion of current will flow through the person's body to ground and return to the power source, instead of flows through N' return to the power source, the current in L' and N' are no longer equal, resulting at a current difference between L' and N' which is commonly considered as "Residual Current". The "Residual Current" will produce the voltage in the secondary of the current sensor T, trip the tripping device 3 to turn off the main circuit switch K. The TEST button in FIG. 11 is used to artificially produce residual current to verify if the electromagnetic tripping device 3 is working properly. When the insulation of the electric device is damaged causing the electric leakage on the surface, the leakage flows from the live wire L, goes through the current sensor T, reaches F through the load and damaged insulation, then, flows from F' through I1 and I2, returns to the neutral wire of the power source through L' or N'. Because the I2 is connected to N' in a node before the current sensor T, the current through I2 will not go through the current sensor T, that makes the currents that go in and go out the current sensor T no longer equal, the secondary of T produces voltage which trips the device 3 to act, breaking the main circuit switch K. In case of the surface leakage is derived from the external power supply, for example, the leakage flows from the live wire L, reaches F through F', then, flows through F', through I1 and I2, through L' or N' returns to the neutral wire of the power source. Because the I1 is connected to N' in a node after the current sensor T, the current through I1 goes through the current sensor T, that makes the currents that go in and go out the current sensor T not equal, the secondary of T produce voltage which trips the device 3 to act, breaking the main circuit switch K. Referring to FIG. 11, the output of the identification device 1 is a double pole double-throw switch which is wired in a way such that one pole is connected with I1 and another pole is connected with I2, and the double-throw is connected to N' and L' respectively. The identification device 1 controls the operations of the double pole double-throw switch according to the live/neutral wire identification results, to make I1 and I2 are always connected to N through L' or through N'.

Embodiment 11

Figure 12:
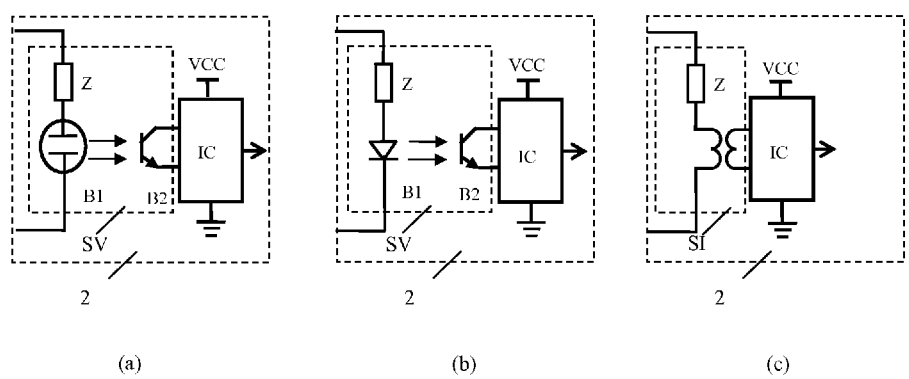

FIG. 2 and FIG. 12 (a) constitutes the embodiment 11 of the present invention. The leakage protection device with live/neutral wire identification function is illustrated in FIG. 2, its leakage signal pickup device 2 which is further illustrated in FIG. 12(a) contains the voltage sensor SV unit which is constituted by impedance Z, luminous component B1 (a neon lamp in this embodiment) and phototransistor B2. The input of the SV is connected with the electric device surface and N, in case of leakage, the luminous component B1 lights, the light signal is received by phototransistor and amplified by IC, and trips the device 3 to act, turning off the main circuit switch K, realize the protection of the electric leakage. The light signal received by phototransistor B2 can also directly trip the device 3 to act, turning off the main circuit switch K.

Embodiment 12

FIG. 2 and FIG. 12 (b) constitutes the embodiment 12 of the present invention. The leakage protection device with a live/neutral wire identification function is illustrated in FIG. 2, its leakage signal pickup device 2 which is further illustrated in detail with reference to FIG. 12(b) contains the voltage sensor SV unit which is constituted by impedance Z, luminous component B1 (a LED in this embodiment) and phototransistor B2. The input of the SV is connected with the electric device surface and N, in case of leakage, the luminous component B1 lights, the light signal is received by phototransistor and amplified by IC, and trips the device 3 to act, turning off the main circuit switch K, the objective of leakage protection is achieved.

Embodiment 13

FIG. 2 and FIG. 12 (c) constitutes the embodiment 13 of the present invention. The leakage protection device having a live/neutral wire identification function is illustrated in FIG. 2, its leakage signal pickup device 2 which is further illustrated in more detail with reference to FIG. 12(c) contains the current sensor SI unit which is constituted by impedance Z and current sensor. The input of the SI is connected with the electric device surface and N, in case of leakage, the primary current in the current sensor will produce voltage in the secondary which is amplified and trips the tripping device 3 to act, turning off the main circuit switch K, the objective of leakage protection is achieved.

The present invention provides a method and apparatus for leakage protection having a live/neutral wire identification function, by means of identification of the live/neutral wires of the power source with a live/neutral wire identification device, if the live/neutral wires are discovered to be erroneously connected, the connections between the live wire L' and the neutral wire N' of an electric device and the live wire N and the neutral wire L of the power source are immediately adjusted directly or indirectly; or, the connection of a surface leakage signal pickup device 2 is adjusted; or, a main circuit switch K is made such that the main circuit switch cannot close the circuit or that the main circuit switch breaks the circuit immediately after closing the circuit, so that a user must correct the connections of the live/neutral wires of the power source; the surface leakage signal pickup device 2 is arranged such that said device is always connected to the neutral wire N of the power source and to the surface F of the electric device, so as to always monitor the electric potential of the surface F of the electric device over the neutral wire N of the power source. When the electric device surface leaks electricity, the leakage signal pickup device 2 immediately drives an electromagnetic tripping device 3 to break the main circuit switch 3, thereby breaking the connection between the electric device and the power source. The method and device of the present invention can remove leakage before a human body experiences an electric shock, thereby eliminating potential accidents; leakage accidents due to connection errors are prevented; electric device surface leakage can be effectively prevented even when the electric device is not connected to ground.

The above mode embodiments are used to illustrate, but not to limit, the principle and the function of the presented invention. Any modification according to the principle and function of this invention described above by the designer with ordinary skill in the pertinent art will not change the coverage of this invention.

The invention claimed is:
1. A method of electric leakage detection comprising below steps:
(1) Identify a live wire (L) or a neutral wire (N) of a power source;

(2) If it is discovered that the live wire (L) is erroneously connected to a neutral wire (N') of an electric device or the neutral wire (N) is erroneously connected to a live wire (L') of an electric device due to the live/neutral wires are erroneously connected, then, change connections of a "surface leakage detection device" from connecting between a surface wire (F') and the neutral wire (N') of the electric device into connecting between the surface wire (F') and the live wire (L') of the electric device; or, reconnect the live wire (L') to the live wire (L) and the neutral wire (N') to the neutral wire (N); or, a main circuit switch (K) is made such that the main circuit switch (K) cannot close circuit or that the main circuit switch (K) breaks circuit immediately after closing the circuit;

(3) The "surface leakage detection device" which is connected between the surface wire (F') and the neutral wire (N), monitors electric leakage of the electric device's surface, once the leakage is found, immediately breaks the main circuit switch (K) which connects the power source and the electric device.

2. The method of claim 1, wherein the steps may be included in an inevitable manual operation and triggered or implemented by a manual operation.

3. The method of claim 1, wherein the identification of the live wire (L) or the neutral wire (N) of the power source comprise:
(a) pre-lock a power supply circuit by making the circuit cannot be closed or breaks the circuit immediately after closing the circuit;
(b) check wiring of live/neutral wire of the power source; if it is wired correctly, unlock the power supply circuit so that the main circuit switch (K) may be closed; otherwise, remain the power supply circuit locked so that the main circuit switch (K) could not be closed, or, the main circuit switch (K) is broken immediately after being closed; by means of combination of (a) and (b), live/neutral wire pre-identification is guaranteed.

4. A device of electric leakage protection comprising: a live wire (L') of an electric device which is connected to a liver wire (L) of a power source by default, a neutral wire (N') of the electric device which is connected to a neutral wire (N) of the power source by default, a surface wire (F') which is connected to the electric device's surface, a surface leakage signal pickup device (2), and an electromagnetic tripping device (3) which controls a main circuit switch (K); wherein the device of electric leakage protection further comprises a live/neutral Wire identification device (1) which is Ground independent; and the device (2) has one terminal connected to the surface wire (F'), another terminal connected to the neutral wire (N) through (N') or through (L').

5. The electric leakage protection device of claim 4, wherein the surface leakage signal pickup device (2), may contain a current sensor (T) in which the live wire (L) and the neutral wire (N) of the power source go through, and one or multiple current path (I) connecting surface (F) of the electric device and the neutral wire (N) of the power source; the current path (I) consists components which allow current to flow, and one end of current path (I) is connected to the surface (F) of the electric device through the surface wire (F') of the electric device, another end is connected to the neutral wire (N) of the power source in a node located before or after the current sensor (T).

6. The electric leakage protection device of claim 4, wherein the surface leakage signal pickup device (2) contains electromagnetic relay or solid relay, the output contacts of the electromagnetic relay or solid relay are connected to coil of the electromagnetic tripping device (3) directly or through a driving circuit, coil of the electromagnetic relay is connected between the surface wire (F') and the neutral wire (N) of the power source directly, or the coil of the electromagnetic relay in series with an impedance (Z) is connected between (F') and (N); the impedance (Z) is either a variety of current limiting components, or rectifying components.

7. A device of live/neutral wire identification connecting the electric leakage protection device of claim 4, wherein input of the device of live/neutral wire identification is connected to the live wire (L') or the neutral wire (N'), output of the device is connected to the surface leakage signal pickup device (2) or the electromagnetic tripping device (3) or a live/neutral wire conversion switch (4), the device of live/neutral wire identification is Ground independent.

8. The live/neutral wire identification device of claim 7, wherein the device, its input is connected to (L') or (N'), its output is comprised of a group or multiple-group conversion switches or contacts; the surface leakage signal pickup device (2) has one terminal connected to (F'), one terminal connected to N via a conversion switch of the live/neutral wire identification device and (N'), in case of live/neutral wires are swapped causing the live wire (L') connecting to the neutral wire (N) or the neutral wire (N') connecting to the live wire (L), the live/neutral wire identification device is activated, its conversion switches or contacts reconnect the surface leakage signal pickup device (2) which is previously connected to the neutral wire (N) through the neutral wire (N'), to the neutral wire N through the live wire (L').

9. The live/neutral wire identification device of claim 7, wherein the device, its input is connected to the live wire (L') or the neutral wire (N'), its output is comprised of a group or multiple-group conversion switches or contacts that consist the live/neutral wire conversion switch (4); the surface leakage signal pickup device (2) has one terminal connected to the surface wire (F'), one terminal connected to the neutral wire (N) via the neutral wire (N'), in case of live/neutral wires are swapped causing the live wire (L') connecting to the neutral wire (N) or the neutral wire (N') connecting to the live wire (L), the live/neutral wire identification device is activated, the live/neutral wire conversion switch (4) reconnects the live wire (L') to the live wire (L) and the neutral wire (N') to the neutral wire (N).

10. The live/neutral wire identification device of claim 7, wherein the device, its input is connected to the live wire (L') or the neutral wire (N'), its output is comprised of a group or multiple-group conversion switches or contacts; the surface leakage signal pickup device (2) has one terminal connected to the surface wire (F'), one terminal connected to the neutral wire (N) of the power source through (N'); in case of live/neutral wires are swapped causing the live wire (L') being connected to the neutral wire (N) or the neutral wire (N') being connected to live wire (L), the live/neutral wire identification device works or not works, a main circuit switch (K) which is controlled by output switches or contacts of the live/neutral wire identification device, is made such that it could not close circuit or that it breaks the circuit immediately after closing the circuit.

11. The live/neutral wire identification device of claim 7, wherein the device, comprising a current limiting component (Z), a luminous component (B1) and a touch electrode (A); (B1) in series with (Z), one end is connected to (A), and another end is connected to the live wire (L) or the neutral wire (N) directly or through the live wire (L') or the neutral wire (N'); the touch electrode (A) contains conductors that a person will touch during operating the electric leakage protection device.

12. The live/neutral wire identification device of claim 7, wherein the device, comprising a current limiting component (Z), a luminous component (B1) and a touch electrode (A); (B1) in series with (Z), one end is connected to (A), and another end is connected to the live wire (L) or the neutral wire (N) directly or through the live wire (L') or the neutral wire (N'); the touch electrode (A) contains the surface (F) of the electric device which is connected to the surface wire (F').

13. The live/neutral wire identification device of claim 7, wherein the device, comprising a high input impedance transistor or a field effect transistor and an induction electrode (S), and a DC power source which is isolated from power source under identification; base electrode of the high input impedance transistor or gate of the field effect transistor is connected to the induction electrode (S), and output of the high input impedance transistor or the field effect transistor is connected with an IC signal amplifier circuit.

* * * * *